(12) United States Patent
Mantell et al.

(10) Patent No.: US 11,884,011 B2
(45) Date of Patent: Jan. 30, 2024

(54) SYSTEM AND METHOD FOR PROVIDING THREE-DIMENSIONAL OBJECT STRUCTURAL SUPPORT WITH A MULTI-NOZZLE EXTRUDER

(71) Applicant: Xerox Corporation, Norwalk, CT (US)

(72) Inventors: David A Mantell, Rochester, NY (US); Jason O'Neil, Rochester, NY (US); Christopher G. Lynn, Wolcott, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 883 days.

(21) Appl. No.: 16/142,702

(22) Filed: Sep. 26, 2018

(65) Prior Publication Data

US 2020/0094474 A1    Mar. 26, 2020

(51) Int. Cl.
| | |
|---|---|
| *B29C 64/40* | (2017.01) |
| *B29C 64/209* | (2017.01) |
| *B29C 64/393* | (2017.01) |
| *B29C 64/118* | (2017.01) |
| *B33Y 50/02* | (2015.01) |
| *B33Y 10/00* | (2015.01) |
| *B33Y 30/00* | (2015.01) |

(52) U.S. Cl.
CPC ......... *B29C 64/209* (2017.08); *B29C 64/118* (2017.08); *B29C 64/393* (2017.08); *B29C 64/40* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | |
|---|---|---|
| 7,765,949 B2 | 8/2010 | Fork et al. |
| 9,815,268 B2 | 11/2017 | Mark et al. |
| 2014/0291886 A1 | 10/2014 | Mark et al. |
| 2015/0096266 A1* | 4/2015 | Divine ............... A61J 1/03 53/452 |
| 2016/0325498 A1 | 11/2016 | Gelbart |
| 2017/0157828 A1 | 6/2017 | Mandel et al. |
| 2017/0157831 A1 | 6/2017 | Mandel et al. |
| 2017/0173884 A1 | 6/2017 | Ryan |

* cited by examiner

*Primary Examiner* — Jacob T Minskey
(74) *Attorney, Agent, or Firm* — Maginot Moore & Beck LLP (57) ABSTRACT

A method of operating a multi-nozzle extruder in an additive manufacturing system enables support structure to be formed while an object is also being formed. The method includes opening more than one nozzle in the multi-nozzle extruder, and operating an actuator with a controller to move the multi-nozzle extruder along a path to form a first group of multiple parallel ribbons of support structure simultaneously with material extruded from the more than one open nozzle.

10 Claims, 11 Drawing Sheets

SYSTEM AND METHOD FOR PROVIDING THREE-DIMENSIONAL OBJECT STRUCTURAL SUPPORT WITH A MULTI-NOZZLE EXTRUDER

TECHNICAL FIELD

This disclosure is directed to multi-nozzle extruders used in three-dimensional object printers and, more particularly, to the operation of such extruders.

BACKGROUND

Three-dimensional printing, also known as additive manufacturing, is a process of making a three-dimensional (3D) solid object from a digital model of virtually any shape. Many three-dimensional printing technologies use an additive process in which an additive manufacturing device forms successive layers of the part on top of previously deposited layers. Some of these technologies use extruders that soften or melt extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Many existing three-dimensional printers use a single nozzle extruder. The printhead moves in a predetermined path to emit the build material through the single nozzle onto selected locations of a support member or previously deposited layers of the three-dimensional printed object based on model data for the three-dimensional printed object. However, using a printhead with only a single nozzle to emit the build material often requires considerable time to form a three-dimensional printed object. Additionally, a printhead with a larger nozzle diameter can form a three-dimensional printed object more quickly but loses the ability to emit build material in finer shapes for higher detailed objects while nozzles with narrower diameters can form finer detailed structures but require more time to build the three-dimensional object.

To address the limitations of single nozzle extruders, multi-nozzle extruders have been developed. In some multi-nozzle extruders, the nozzles are formed in a common faceplate and the materials extruded through the nozzles can come from one or more manifolds. In extruders having a single manifold, all of the nozzles extrude the same material, but the fluid path from the manifold to each nozzle can include a valve that is operated to open and close the nozzles selectively. This ability enables the shape of the swath of thermoplastic material extruded from the nozzles to be varied by changing the number of nozzles extruding material and selectively operating which nozzles extrude material. In multi-nozzle extruders having a plurality of manifolds, some nozzles can extrude a material different than the materials extruded by other nozzles depending upon the manifold to which a nozzle is connected. The fluid path from one of the manifolds to its corresponding nozzle can include a valve that is operated to open and close the nozzle selectively. This ability enables the composition of the material in a swath to vary as well as the shape of the swath of thermoplastic material extruded from the nozzles to be varied. Again, these variations are achieved by changing the number of nozzles extruding material and altering which nozzles are opened to extrude material. These multi-nozzle extruders enable different materials to be extruded from different nozzles to form an object without having to coordinate the movement of different extruder bodies. These different materials can enhance the ability of the additive manufacturing system to produce objects with different colors, physical properties, and configurations. Additionally, by changing the number of nozzles extruding material, the size of the swaths produced can be altered to provide narrow swaths in areas where precise feature formation is required, such as object edges, and to provide broader swaths to form areas of an object, such as its interior regions, quickly.

Many 3D objects have features and appendages that are cantilevered above the printing surface and cannot be printed using a simple layer-by-layer decomposition of the object. When forming these objects, some form of support must be printed so the initial layers of the features and appendages can be built on the support rather than in midair. In some cases, this support is formed with a material that is different than the material used to form the part and the support material is chosen to be a material that can be easily removed from the object. With manufacturing systems that use single nozzle extruders, another single nozzle extruder is provided to form the support structures with the different material; however, the complication of adding another extruder and, in most cases, needing additional time to operate the additional extruder to print the support structure material can be expensive in time and resources.

Using a multi-nozzle extruder can address some of the issues occurring with the use of multiple single nozzle extruders since different nozzles can be connected to different sources of materials. Unfortunately, such a configuration reduces the number of nozzles that are available for forming 3D object structure so the internal fill swaths are narrower and require more passes. Additionally, maneuvering of the multi-nozzle extruder head is complicated since the nozzles have to be positioned to extrude support structure material to locations where only support structures are formed and having to position nozzles extruding build material to locations where only object portions and features are formed. If support structures are formed with build material using known techniques the support structures become part of the object being formed and cannot be separated from the object without destroying the structural integrity of the object. More efficient use of multi-nozzle extruders to form both object portions and support structures would be beneficial.

SUMMARY

A new multi-nozzle extruder system is configured to enable object portions and support structures to be formed with a single multi-nozzle extruder without extruding different materials from the extruder. The multi-nozzle extruder system includes a multi-nozzle extruder having a faceplate with a plurality of nozzles, a plurality of valves, each valve in the plurality of valves being configured to open and close one of the nozzles in a one-to-one correspondence, an actuator operatively connected to the multi-nozzle extruder, the actuator being configured to move the multi-nozzle extruder in a plane parallel to the faceplate and to move the multi-nozzle extruder toward and away from a surface on which the multi-nozzle extruder emits extrusion material, and a controller operatively connected to the plurality of valves and the actuator. The controller is configured to open more than one nozzle in the multi-nozzle extruder and operate the actuator to move the multi-nozzle extruder along a path in the plane parallel to the faceplate to form a first group of multiple parallel ribbons of support structure simultaneously with material extruded from the more than one open nozzle.

A method of operating a multi-nozzle extruder system enables object portions and support structures to be formed with a single multi-nozzle extruder without extruding different materials from the extruder. The method of operation includes opening more than one nozzle in the multi-nozzle extruder, and operating an actuator with a controller to move the multi-nozzle extruder along a path to form a first group of multiple parallel ribbons of support structure simultaneously with material extruded from the more than one open nozzle.

BRIEF DESCRIPTION OF THE DRAWINGS

The foregoing aspects and other features of a multi-nozzle extruder system configured to enable object portions and support structures to be formed with a single multi-nozzle extruder without extruding different materials from the extruder are explained in the following description, taken in connection with the accompanying drawings.

DETAILED DESCRIPTION

For a general understanding of the environment for the device disclosed herein as well as the details for the device, reference is made to the drawings. In the drawings, like reference numerals designate like elements.

As used herein, the term "extrusion material" refers to a material that is emitted from an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Build materials also include other materials that do not require heating but are later hardened by exposure to air or energy, such as UV light or heat. These types of materials include food materials. For example, chocolate and cheese can be extruded to form objects in various shapes, such as bunnies, eggs, or the like. Examples of support materials include, but are not limited to, high-impact polystyrene (HIPS), polyvinyl alcohol (PVA), and other materials capable of extrusion after being thermally treated. In some extrusion printers, the extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. Although the illustrated examples use extrusion material that is supplied as filament to the heaters, other extrusion material supplies can be used, such as particulate or spherical ball extrusion materials. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in an extruder during operation of a three-dimensional object printer. The melted extrusion material is also denoted as "thermoplastic material" in this document. As those of skill in the art recognize, certain amorphous extrusion materials do not transition to a pure liquid state during operation of the printer.

As used herein, the terms "extruder" refers to a component of a printer that pressurizes extrusion material in a single chamber so the extrusion material migrates to a manifold connected to one or more nozzles for emission. The extrusion material can be at room temperature for some materials, such as epoxies and glues. Other extrusion materials are heated to a temperature that melts or softens the extrusion material so it flows to the manifold connected by passageways to one or more nozzles. The multi-nozzle extruders described in this document include a valve assembly that can be electronically operated to move pins to block or enable extrusion material flow to the nozzles so extrusion material is emitted from the nozzles selectively and independently. A controller operates the valve assembly to connect the nozzles in a plurality of nozzles to the manifold independently and emit the extrusion material. As used herein, the term "nozzle" refers to an orifice in an extruder housing that is fluidly connected to the manifold in an extruder and through which extrusion material is emitted towards a material receiving surface. During operation, the nozzle can extrude a substantially continuous linear swath of the extrusion material along the process path of the extruder. The diameter of the nozzle affects the width of the line of extruded material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of extrusion material for delivery to one or more nozzles in the extruder during a three-dimensional object printing operation. As used herein, the term "swath" refers to any pattern of multiple extrusion material ribbons emitted simultaneously from multiple nozzles of a multi-nozzle extruder onto a material receiving surface during a three-dimensional object printing operation. Single nozzle extruders are unable to form swaths as they can produce only a single ribbon of extrusion. Common swaths include straight-line linear arrangements of extrusion material and curved swaths. In some configurations, the extruder extrudes the material in a continuous manner to form the swath with a contiguous mass of the extrusion material in both process and cross-process directions, while in other configurations the extruder operates in an intermittent manner or at some angle of movement that forms smaller groups of extruded material that are discontinuous in either a process or cross-process direction and are arranged along a linear or curved path. The three-dimensional object printer forms various structures using combinations of different swaths of the extrusion material. Additionally, a controller in the three-dimensional object printer uses object image data and extruder path data that correspond to different swaths of extrusion material prior to operating a multi-nozzle extruder to form each swath of extrusion material.

As used herein, the term "process direction" refers to a direction of relative movement between an extruder and a material receiving surface that receives extrusion material emitted from one or more nozzles in the extruder. The material receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion. Additionally, one or more actuators are operatively connected to the extruder, the platform on which a three-dimensional object is formed, or both to move the extruder and the platform toward and away from one another. This type of movement is sometimes referred to as vertical movement or movement of the extruder, the platform, or both along the Z-axis.

As used herein, the term "cross-process direction" refers to an axis that is perpendicular to the process direction and parallel to the extruder faceplate and the material receiving surface. The process direction and cross-process direction refer to the relative path of movement of the extruder and the surface that receives the extrusion material emitted from one or more nozzles. In some configurations, the extruder includes an array of nozzles that can extend in the process direction, the cross-process direction, or both. Adjacent nozzles within the extruder are separated by a predetermined distance in the cross-process direction. In some configurations, the system rotates the extruder to adjust the cross-process direction distance that separates different nozzles in the extruder to adjust the corresponding cross-process direction distance that separates the lines of extrusion material emitted from multiple nozzles in a multi-nozzle extruder as the lines form a swath.

During operation of the additive manufacturing system, an extruder moves in the process direction along both straight and curved paths relative to a surface that receives material extruded during the three-dimensional object printing process. Additionally, an actuator in the system optionally rotates the multi-nozzle extruder about the Z axis to adjust the effective cross-process distance that separates nozzles in the multi-nozzle extruder to enable the extruder to form two or more lines of extrusion material with predetermined distances between each line of the extrusion material. The multi-nozzle extruder moves both along the outer perimeter to form outer walls of a two-dimensional region in a layer of the printed object and within the perimeter to fill all or a portion of the two-dimensional region with the extrusion material.

Figure 1:
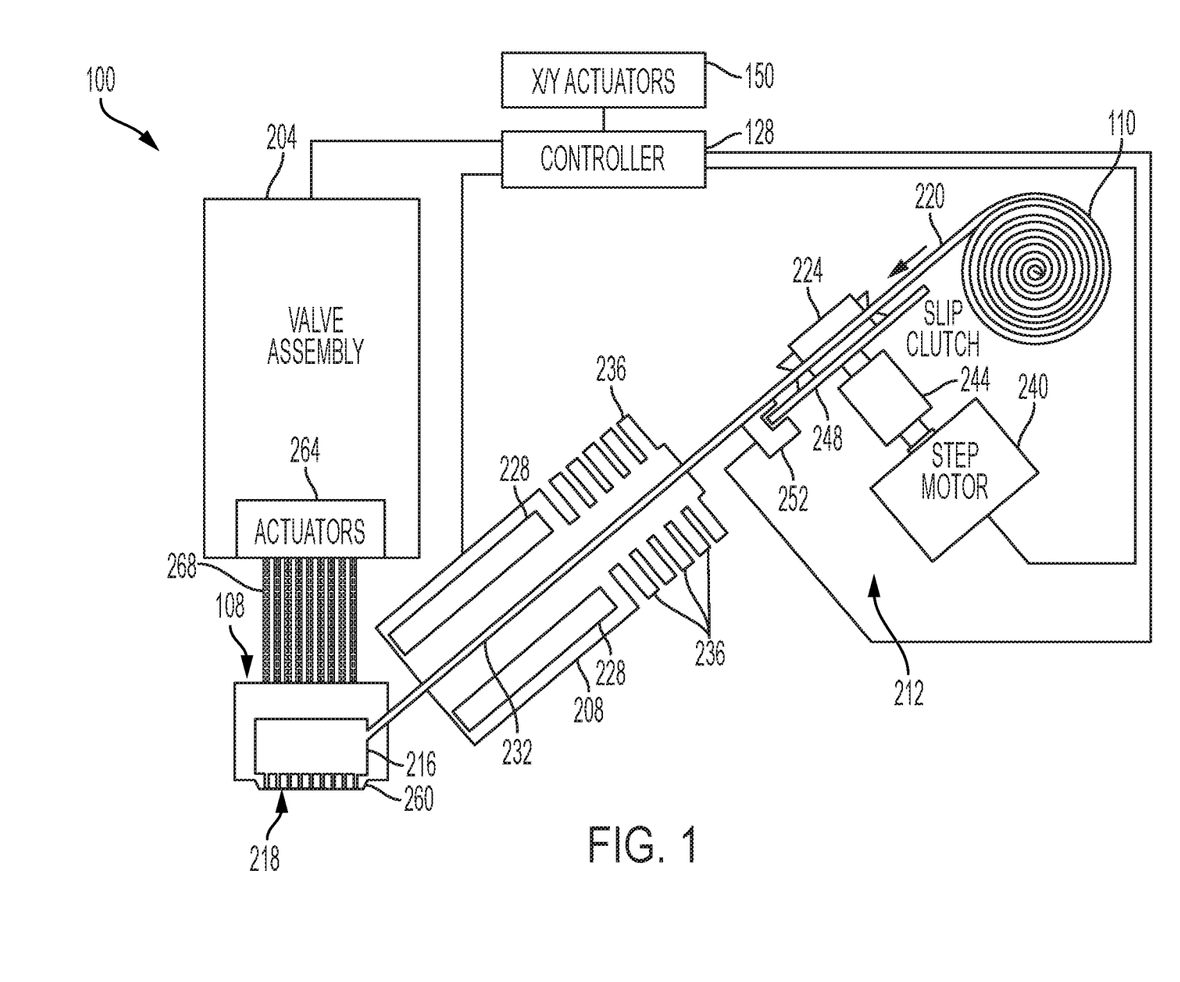
FIG. 1 depicts an additive manufacturing system that can be operated to form object portions and support structures with a single multi-nozzle extruder without extruding different materials from the extruder.

FIG. 1 depicts an additive manufacturing system 100 having a multi-nozzle extruder head 108 that extrudes an extrusion material through nozzles 218 in a planar member, sometimes called a faceplate, 260. Although the printer 100 is depicted as a printer that uses planar motion to form an object, other printer architectures can be used with the extruder and the controller configured to regulate speed of the extruder with reference to the angular orientation of the extruder. These architectures include delta-bots, selective compliance assembly robot arms (SCARAs), multi-axis printers, non-Cartesian printers, and the like. The motions in these alternative embodiments still have process and cross-process directions as defined above and the nozzle spacing in the extruders of these embodiments still define the nozzle spacing with respect to the cross-process direction. Only one manifold 216 is shown in FIG. 1 to simplify the figure, but the extruder head 108 can have a plurality of manifolds 216. In one embodiment, each manifold 216 in the extruder head 108 is operatively connected to a different heater 208 that is fed by a different extrusion material supply 110 in a one-to-one-to-one correspondence. In the extruder head 108, each nozzle 218 is fluidly connected to only one of the manifolds within the extruder head 108 so each nozzle can extrude a material that is different than the materials extruded from nozzles connected to other manifolds. Extrusion from each nozzle is selectively and independently activated and deactivated by controller 128 operating the actuators 264 that are operatively connected to the pins within the sleeves 268 to reciprocate the pins within the sleeves, which are hollow members. The actuators, pins, and sleeves form a plurality of valves that are arranged in a one-to-one-to-one correspondence with each other and with a nozzle in the faceplate. A distal end of each nozzle 218 is flush with the faceplate 260 to enable the faceplate 260 to be used to shape swaths of the materials in an object. The pins within the sleeves 268 are elongated solid members that extend from the actuator to the nozzle openings and are moved to allow material to flow selectively from the nozzles. The flow of material is terminated when an actuator of a valve is operated by the controller to move the pins into engagement with the nozzles and the material flows when the actuator is operated to retract the pins from the nozzles.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators 150 that control the movement of a support member that supports an object being formed with material extruded from the extruder head 108. The controller 128 is also operatively connected to a memory that includes volatile data storage devices, such as random access memory (RANI) devices, and non-volatile data storage devices such as solid-state data storage devices, magnetic disks, optical disks, or any other suitable data storage devices. The memory stores programmed instruction data and three-dimensional (3D) object image data. The controller 128 executes the stored program instructions to operate the components in the printer 100 to form a three-dimensional printed object on the support member and to form support structures that support object features that extend from the object. The support structures can be formed with the same material as the object or, if multiple manifolds are included in the extruder head as explained above, the support structures can be formed with material different than the material used to form the object. The 3D object image data includes, for example, a plurality of two-dimensional image data patterns that correspond to each layer of extruded material that the printer 100 forms during the three-dimensional object printing process. The extruder path control data include a set of geometric data or actuator control commands that the controller 128 processes to control the path of movement of the extruder head 108 using the actuators 150 and to control the orientation of the extruder head 108 and the valve assembly 204 using a Zθ actuator in the actuators 150. The Zθ actuator is configured to rotate the extruder head 108 and valve assembly 204 about a Z-axis that is perpendicular to the faceplate 260 and extends between the faceplate 260 and the support member. The extruder head 108 and the valve assembly 204 are collectively called an extruder in this document. The controller 128 operates the actuators to move the extruder head 108 above the support member as noted above while the extruder extrudes material to form an object and support structures.

The system 100 of FIG. 1 also includes an extrusion material dispensing system 212 for each heater 208 that is connected to a manifold 216 in the extruder head 108. The extrusion material from each separate supply 110 is fed to the corresponding heater 208 at a rate that maintains the pressure of the thermoplastic material in the manifold 216 connected to the heater 208 within a predetermined range during operation of the system 100. The dispensing system 212 is one embodiment that is suitable for regulating pressure of the material in each manifold of the extruder head 108. Additionally, the controller 128 is operatively connected to an actuator in each dispensing system 212 to control the rate at which the dispensing system 212 delivers extrusion material from a supply 110 to the heater 208 fed by the supply. The heater 208 softens or melts the extrusion material 220 fed to the heater by the drive roller 224. Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208, alternative embodiments of the dispensing system 212 use one or more actuators to operate a mechanical mover in the form of a rotating auger or screw. The auger or screw moves solid phase extrusion material from a supply 110 in the form of extrusion material powder or pellets into the heater 208.

In the embodiment of FIG. 1, each heater 208 has a body formed from stainless steel that includes one or more heating elements 228, such as electrically resistive heating elements, which are operatively connected to the controller 128. Controller 128 is configured to connect the heating elements 228 to electrical current selectively to soften or melt the filament of extrusion material 220 in the channel or channels within the heater 208. While FIG. 1 shows heater 208 receiving extrusion material in a solid phase as solid filament 220, in alternative embodiments, the heaters receive the extrusion material in solid phase as powdered or pelletized extrusion material. Cooling fins 236 attenuate heat in the channels upstream from the heater. A portion of the extrusion material that remains solid in a channel at or near the cooling fins 236 forms a seal in the channel that prevents thermoplastic material from exiting the heater from any opening other than the connection to the manifold 216, which maintains a temperature that keeps the extrusion material in a thermoplastic state as it enters the manifold. The extruder head 108 can also include additional heating elements to maintain an elevated temperature for the thermoplastic material within each manifold within the extruder head. In some embodiments, a thermal insulator covers portions of the exterior of the extruder head 108 to maintain a temperature within the manifolds within the extruder head. Again, the regions around the nozzles are maintained at a temperature that keeps the material in a thermoplastic state so it does not begin solidifying as it travels to the distal ends of the nozzles 218 in the faceplate 260.

To maintain a fluid pressure of the thermoplastic material within the manifolds 216 within a predetermined range, avoid damage to the extrusion material, and control the extrusion rate through the nozzles, a slip clutch 244 is operatively connected to the drive shaft of each actuator 240 that feeds filament from a supply 110 to a heater. As used in this document, the term "slip clutch" refers to a device that applies frictional force to an object to move the object up to a predetermined set point. When the range about the predetermined set point for the frictional force is exceeded, the device slips so it no longer applies the frictional force to the object. The slip clutch enables the force exerted on the filament 220 by the roller 224 to remain within the constraints of the strength of the filament no matter how frequently, how fast, or how long the actuator 240 is driven. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its average speed is slightly faster than the rotation of the roller 224. This operation ensures that the torque on the drive roller 224 is always a function of the slip clutch torque.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of valves opened or closed in the valve assembly 204 and the torque set point for the clutch also affect the filament drive system 212 operation. The resulting rotational speed of the roller 224 is identified by the signal generated by the sensor 252. A proportional-integral-derivative (PID) controller within controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of material required in the manifold for adequate formation of the object. These print conditions include the type of extrusion material being fed to the extruder, the temperature of thermoplastic material being emitted from the extruder, the speed at which the extruder is being moved in the X-Y plane, the position of the feature being formed on the object, the angle at which the extruder is being moved relative to the platform, and the like.

Figure 3:
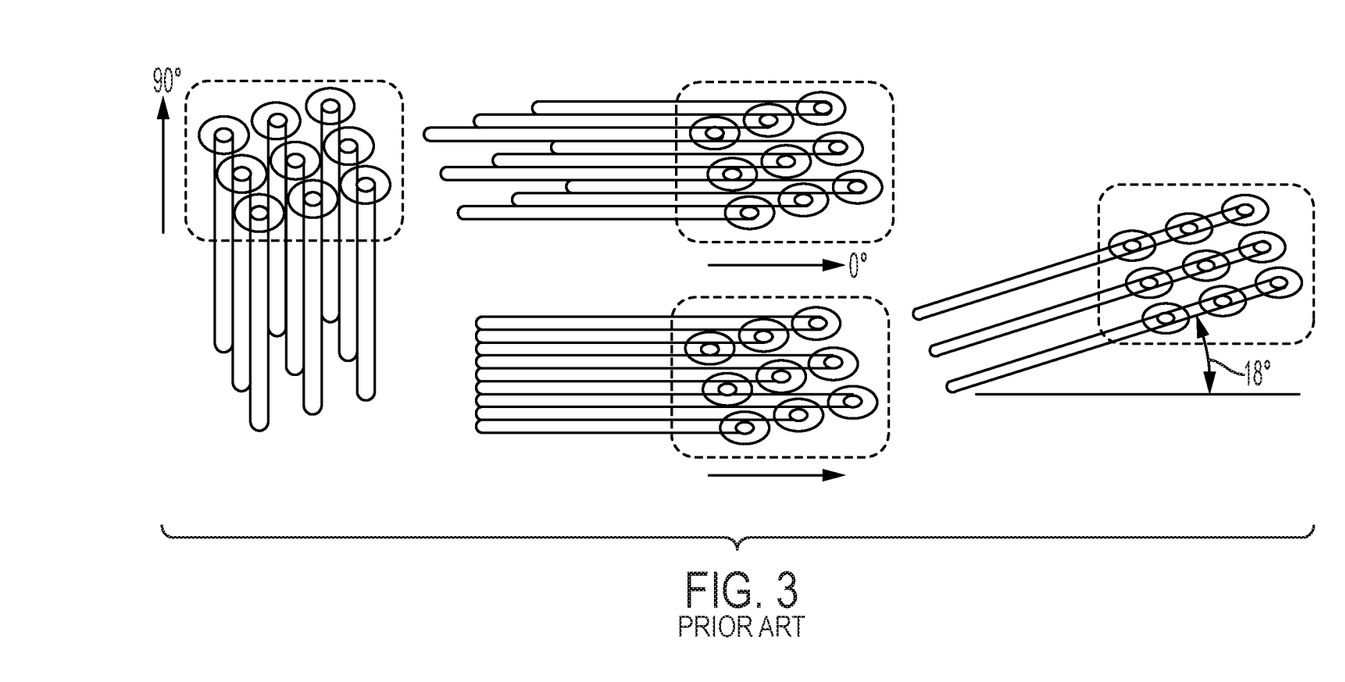
FIG. 3 depicts a prior art extruder nozzle array configuration and paths of movement that are useful for filling interior regions of an object.

A prior art multi-nozzle extruder nozzle array is shown in FIG. 3. This configuration of nozzles has nine nozzles, each of which is 0.4 mm wide. The rows of nozzles are oriented at an angle with respect to the horizontal and vertical axes of the planar member in which the nozzle array is formed. When the extruder is oriented as shown and moved in either direction along the 0°-180° (horizontal axis) and in either direction along the 90°-270° (vertical axis) and all of the nozzles are opened, the extruder consistently produces a continuous swath of extruded material as shown in the figure. In the particular embodiment shown in FIG. 3, the width of the swath is 3.6 mm wide. This swath is the broadest swath that is contiguous across its width that the extruder can form and is primarily used to fill interior regions of an object.

Figure 4:
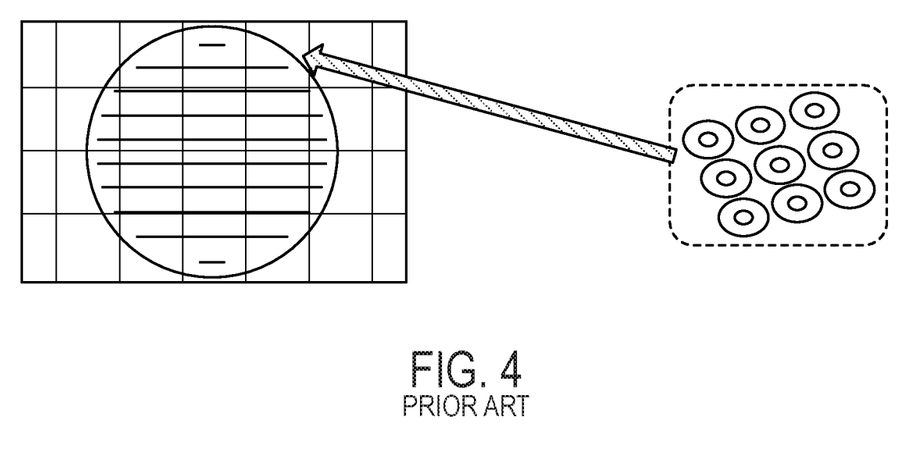
FIG. 4 depicts a combination of opened and closed nozzles in the prior art nozzle array of FIG. 3 that is useful for forming a cylindrical object.

To form a cylindrical object, the nozzles are opened as shown in FIG. 4. The center nozzle is opened to form the perimeter of the object, while the remaining nozzles that are within the perimeter are opened and closed as appropriate to form an interior portion of the object adjacent to the perimeter. "Appropriate" as used in this sense means fewer nozzles contribute material in areas bounded by acute angles so the material is proportionately distributed in that region. Thus, the open/closed status of the nozzles within the interior of the perimeter being formed by the center nozzle changes as the center nozzle of the extruder follows a circular path, without rotating the extruder about an axis normal to the faceplate, to form the cylindrical wall of the exterior of the object.

At some angles of movement, the nozzles of the extruder shown in FIG. 3 line up into distinct rows and form discrete ribbons of material that are not contiguous in the cross-process direction as shown in the figure. To compensate for this phenomenon, the speed of extruder movement along the path is reduced to allow more time for the extrusion material to spread and fill the gaps between the ribbons of the swath being formed. The angles where this effect is most pronounced for the nozzle array shown in FIG. 3 is 18°+ multiples of 90°. At these angles, the speed can be slowed to as much as one-half of the typical speed used to move the extruder along the horizontal and vertical paths, but typically the speed is reduced to two-thirds of that typical speed.

The system of FIG. 1 has a controller that is configured to move the extruder along paths and at speeds that enable the non-contiguous ribbons in the swath shown in FIG. 3 to be usefully deployed as support structure during formation of an object. By forming the support structure with multiple isolated parallel ribbons of material simultaneously extruded from nozzles outside of the perimeter of the object, a solid surface of an object feature can be printed on the support structure. The isolated ribbons forming the support structure save material and make the support structure easier to break away from the completed part.

When the extruder nozzle array shown in FIG. 3 is used in the system of FIG. 1, good path angles for extruder movement to form support structure are 45° and 225° or −45° and 135°. The controller 128 is configured with programmed instructions stored in a memory connected to the controller that when executed by the controller cause the controller to operate one or more actuators 150 to move the extruder along these paths useful for support structure formation. These path angles enable the nozzles to be equally spaced along the path of movement so a solid base of a feature can be formed over the structure when the multi-nozzle extruder head is moved at 0° or 90° to form a feature or infill an area within an object perimeter. Also, along the path angles for structure formation, the multi-nozzle extruder array is effectively wider because the centers of the outer nozzles are 3.2 mm apart when the extruder is moved along the 0° or 90° paths for infill or feature formation, while bidirectional movement along the 45° or −45° paths causes the centers of the outer nozzles to be 3.4 mm apart for support structure formation. The outside edge of one outer nozzle to the outside edge of the other outer nozzle is 3.6 mm when moved along the 0° or 90° paths and is 3.8 mm when moved along the 45° or −45° paths. These path angles also enable only three nozzles to be used to form the support structures and the centers of the three ribbons are separated from one another by 1.7 mm, while an area infill or feature is formed by three ribbons that are separated by 1.6 mm. Alternatively, four nozzles could be used along these paths to separate the ribbons by 1.1 mm, which reduces the spacing between support structures, but using three nozzles, rather than four nozzles, provides a material savings, which is more advantageous in some situations. Forming support structure with three open nozzles along these paths enables the multi-nozzle extruder to be advanced from the path of movement by a distance of 5.1 mm to form equally spaced parallel support swaths, which is wider than the distance of 4.8 mm by which the extruder head is advanced laterally when moving along the 0° or 90° paths to emit ribbons for infill or feature formation. Four nozzles can be opened for support structure formation along the 45° or −45° paths to enable the multi-nozzle extruder to be advanced laterally by a distance of 4.5 mm to form equally spaced parallel support swaths for support structure formation.

Figure 2A:
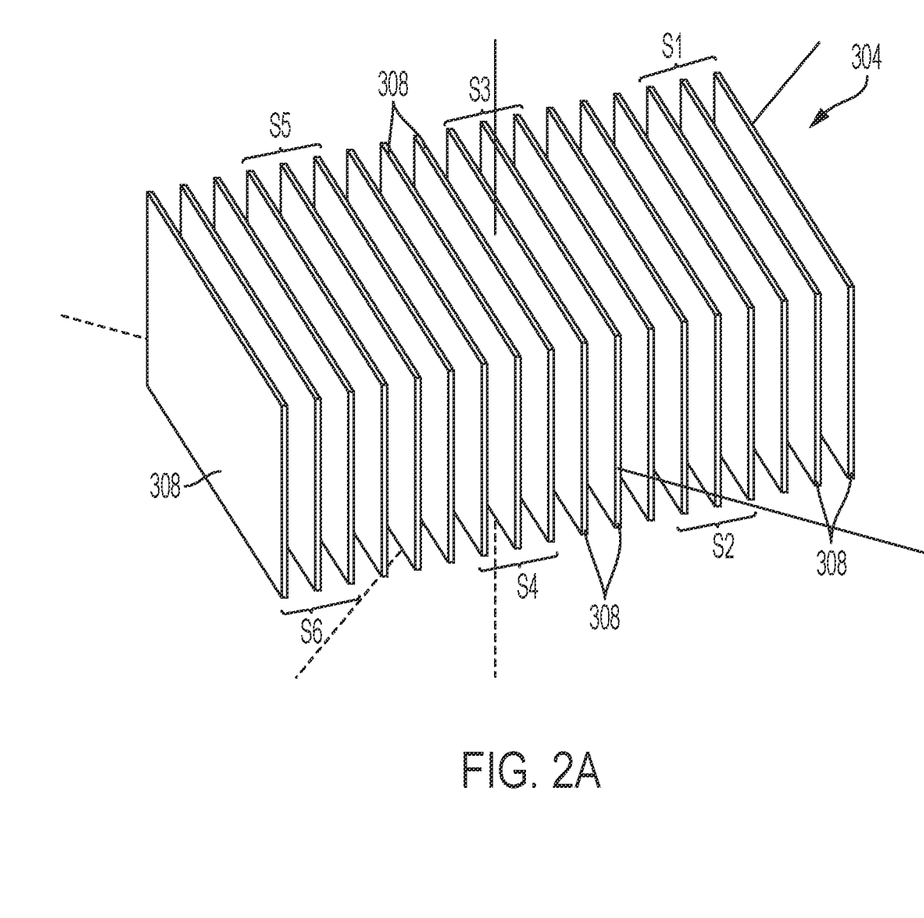
FIG. 2A depicts isolated columns of support structure formed by the system of FIG. 1.

The support structures can be formed with the controller 128 being configured to move the extruder in different ways along these paths. For one, the controller 128 can be configured to operate an actuator to move the extruder bidirectionally along one of the 45° and 225° paths or along the 135° and −45° paths to produce swaths having three parallel individual ribbons of material. The swaths in successive layers of the support structure are placed on top of each other so the swaths stack to form isolated columns 308 of support 304 as shown in FIG. 2A. In the figure, swaths S1, S3, and S5 are formed as the extruder moves in the 135° direction and swaths S2, S4, and S6 are formed as the extruder moves in the −45° directions. This approach stabilizes the support structure and helps the ribbon formation be more consistent. Before transitioning to laying an object feature on the support structure with material extruded at one of the infill angles, the angle of extruder movement is switched, either to −135° or 45°, respectively, or to 0° or 90° in the direction perpendicular to the angle of movement needed to form the next layer for the base of the object in the region above the support structure. Switching movement direction for layer formation prior to infilling the base of an object feature reduces the risk that material forming a base of an object feature that rests on the support structure falls between the isolated columns of the support structure. As shown in FIG. 2H, at least one layer of swaths formed with ribbons oriented at 45° are formed on a plurality of isolated columns to help support the base of an object feature. This type of multi-nozzle extruder movement can be augmented by making the spacing between the support structure layer and the bottom layer of the feature to be supported by the support structure slightly larger to reduce adhesion of the object to the support structure. This change can be achieved, for example, by the controller operating the extruder to make each layer or at least the last layer in the support structure slightly less thick than the layers of the object in proximity to the support structure so the greater distance between the bottom layer of the object features and the top layer of the support structure on which it rests reduces the contact between the two layers. Typically, this distance is in the range of about ¼ to about ½ of the layer thickness for commonly encountered object layers. A typical layer thickness for an extruder with 0.4 mm nozzles is 0.2 mm so the gap would be in the range of about 0.05 to about 0.1 mm.

Figure 2B:
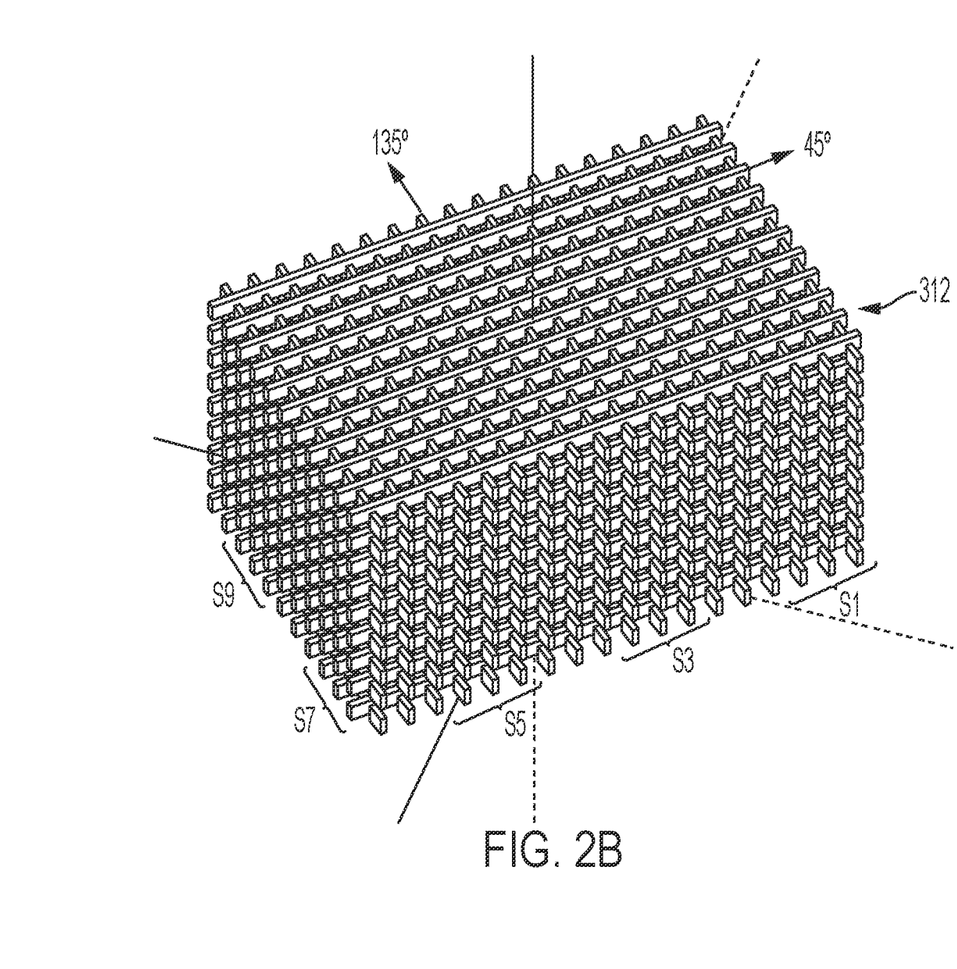
FIG. 2B depicts alternating layers of support structure that crisscross at perpendicular angle formed by the system of FIG. 1.

Another controller configuration used to form support structure, such as structure 312 in FIG. 2B, is to alternate extruder movement between 45°/225° and 135°/−45° for successive layers of the support structure. In this structure, the bottom layer is formed by the extruder being moved as described above with regard to FIG. 2A and the next layer is formed with the extruder being moved in the 45° direction to form swaths S7 and S9 and in the −135° to form the swath between S7 and S9. This method of support structure formation produces swaths of individual ribbons that crisscross one another in perpendicular diagonal directions. This method of formation produces support structures that are similar to those formed with single nozzle extruders except these support structures are formed more efficiently because they are formed by moving a multi-nozzle extruder having multiple nozzles open to form the swaths. Since the ribbons are separated from one another, the width of the individual lines can be adjusted by the controller 128 operating the step motor 240 to alter the amount of filament fed to the multi-nozzle extruder. Wider lines are produced by feeding more filament and narrower ones by feeding less filament.

Figure 2C:
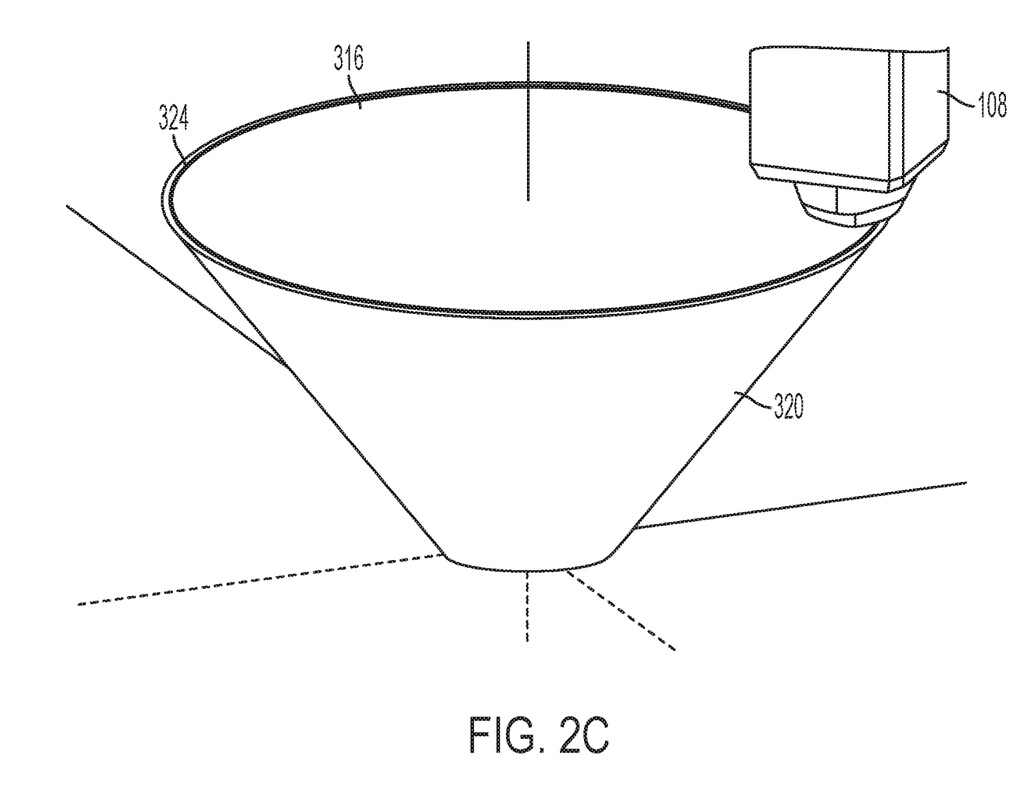
FIG. 2C depicts the formation of a support structure as a perimeter of an object is being formed by the system of FIG. 1.
Figure 2D:
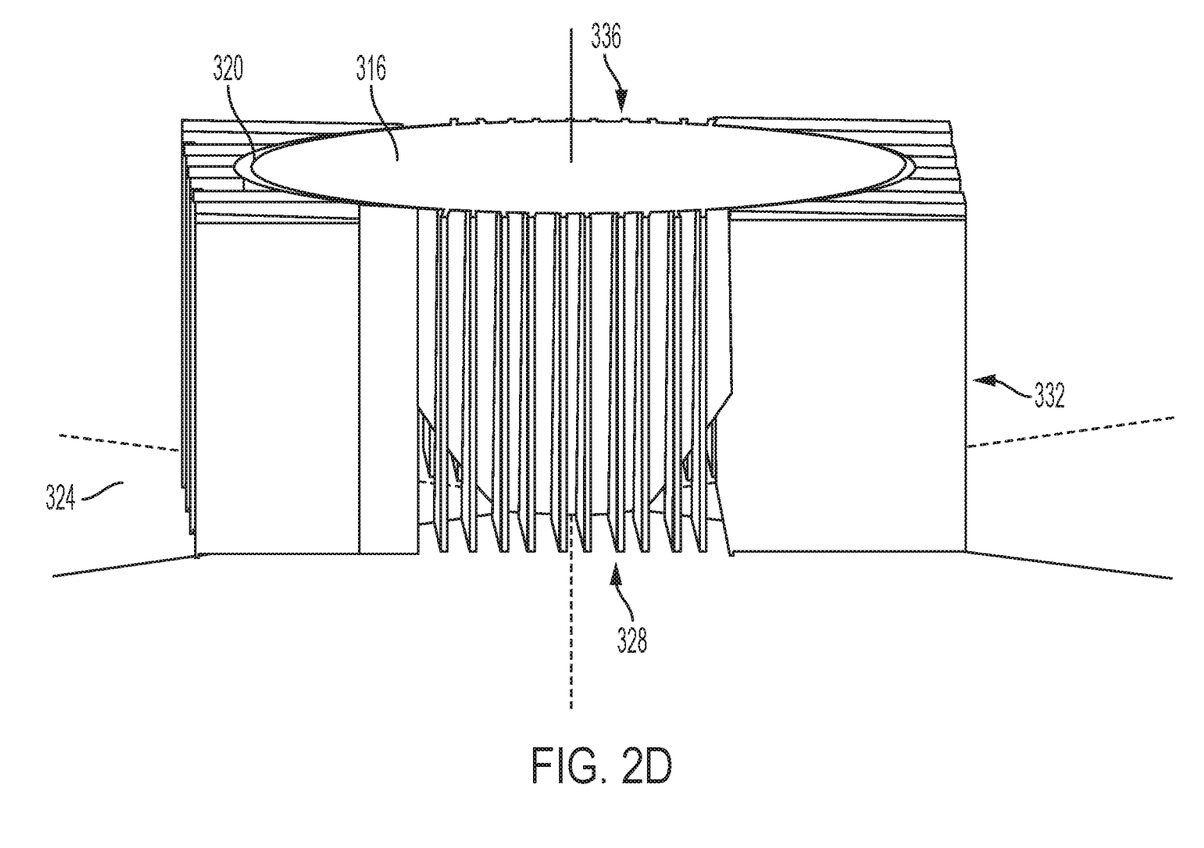
FIG. 2D depicts a side view of support structure to the support structure of FIG. 2C formed by the system of FIG. 1.
Figure 2E:
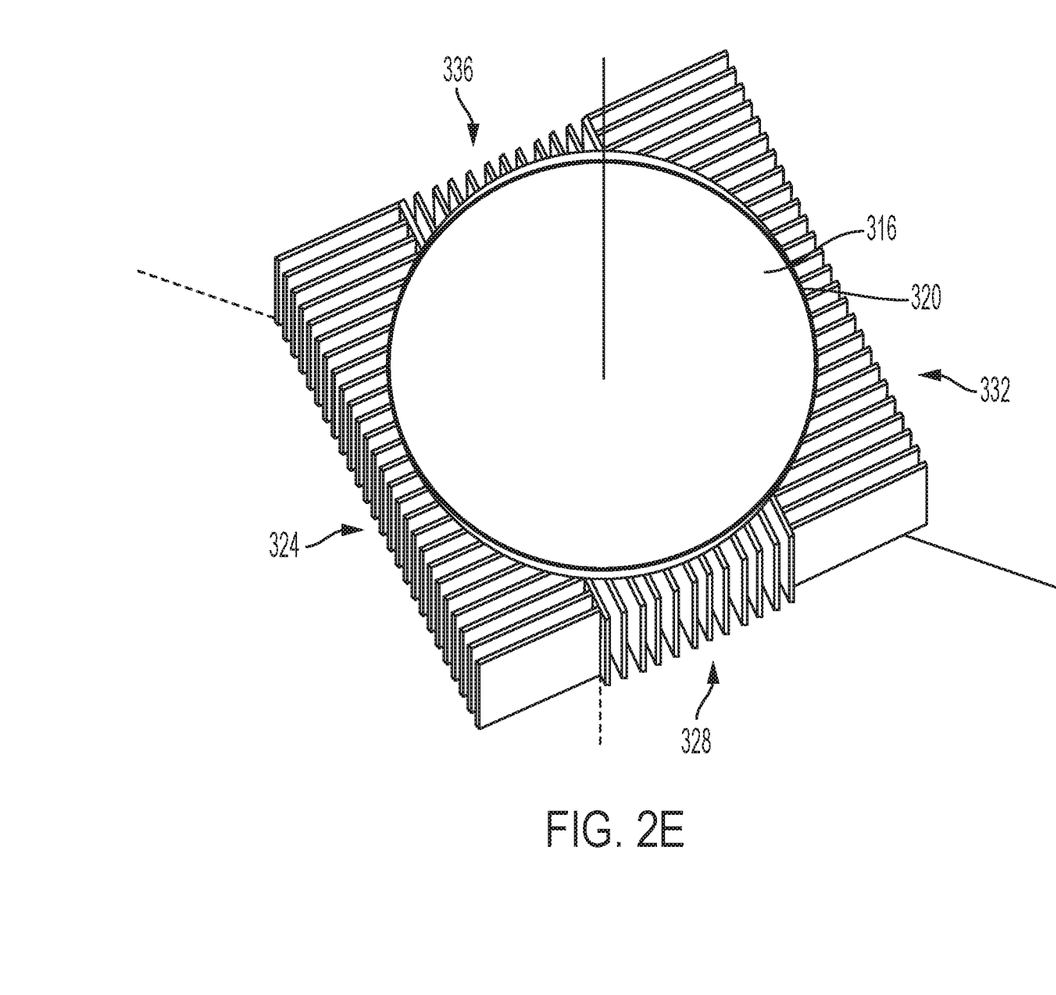
FIG. 2E depicts a top view of the support structures in FIG. 2D.

These methods for forming support structures with a multi-nozzle extruder have been described with reference to the support these structures provide for the bottom layer of an object feature. Not all portions of an object need to have underlying support. Portions printed at angles close enough to vertical can be formed without support structure but if the angle gets too far from vertical, problems can occur, such as reduced surface quality. At more extreme angles off vertical, those portions of the object may break or fail to print well enough to enable the part to be completed. The angle at which any of these problems arise needs to be avoided. Interaction between the support structures and the sides of objects also need to be considered when the slopes of the underside of the object features are below the angle where these problems arise. Typically, the support structure needs to be close enough to the perimeter to provide adequate support but not so close that it cannot be broken away easily. One way to accomplish this goal is to extrude a ribbon of material outside of and parallel to the object perimeter. By using the middle nozzle to form the outside of the perimeter, one of the normally closed nozzles outside the perimeter can be opened to extrude material near the surface of the part. Typically, the nozzle closest to the perimeter is too close because the emitted ribbon adheres to the part too strongly but the nozzle next closest to the center nozzle typically does not produce a structure that is too close to the perimeter. One of the other nozzles, such as the nozzle most distant from the center nozzle and outside the perimeter can be opened, however, to form a support structure outside of the object perimeter. Other nozzles other than the closest nozzle can often be used in addition to or instead of the most distant nozzle from the center nozzle. This type of structure formation is shown in FIG. 2C. In that figure, the inner surface of the frusto-conical object 316 can be viewed and the perimeter is formed by the center nozzle in the faceplate of the extruder 108 while the support structure 320 is formed by an outer nozzle. The black line in the figure between the object 316 and the support 320 identifies the gap between them. Support structure for the support 320 can be formed with isolated columns 324 and 332 formed along the 45° to 225° axis and isolated columns 328 and 336 formed along the 135° to −45° axis as shown in FIG. 2D and FIG. 2E.

Perimeters can also be formed at various angles and the nozzle used to print the outside support varies as a function of the angle of the perimeter. The outside perimeter then can be attached directly to individual columns of the support structure that were printed at −45°, 45°, 225°, or 135°, with the angles of the support structure layers in the surrounding region chosen to ensure that the support can intersect the outside perimeter. Thus, if the outside perimeter is printed with a swath at an angle of 45°, then the support structure layers are printed at 135° to ensure that the columns of the support structure touch the outside perimeter. In some cases, the nozzles that are exterior to one portion of the object are close to or even overlap other portions of the object, such as the corner of an obtuse angle. In these cases, the nozzles are opened only when they are exterior to all sides of the object and, in some tight corners, all exterior nozzles must be turned off.

The controller 128 can also be configured to operate the valves to open more than one of the nozzles outside of the perimeter to form a stronger support structure that can act as support for the perimeter of the part. For a nine-nozzle extruder, as many as five nozzles can be opened and four nozzles turned off to print the perimeter of an object. As many as three of these four normally off nozzles can be turned on to provide a support structure that is close to but separable from the perimeter of the object and that follows the shape of the perimeter.

Figure 2F:
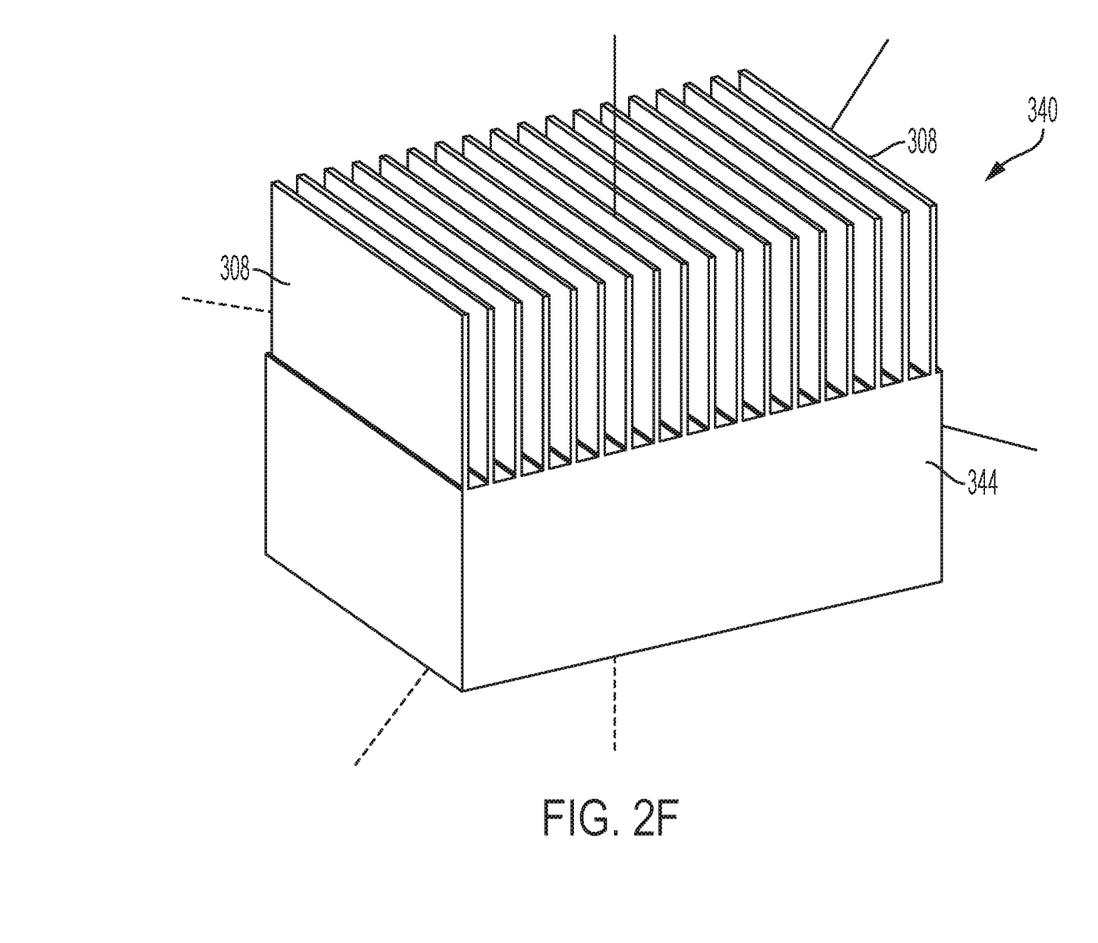
FIG. 2F depicts the formation of a support structure having isolated columns on a block of solid layers formed by the system of FIG. 1.
Figure 2G:
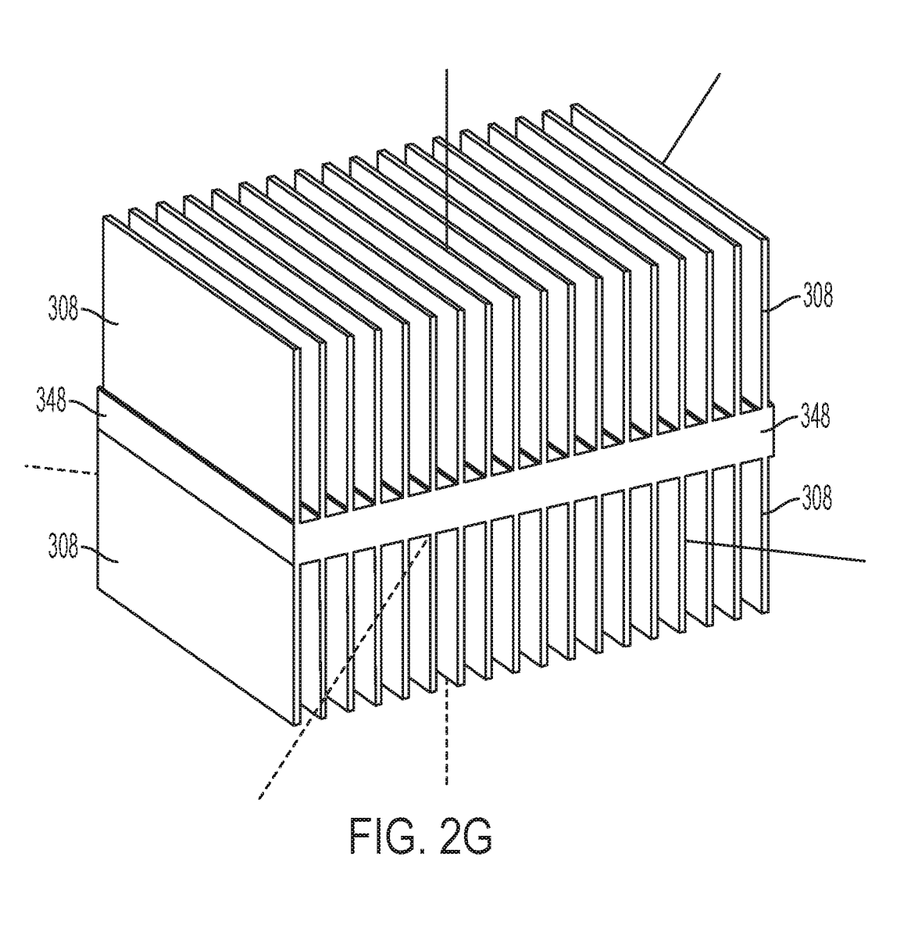
FIG. 2G depicts the formation of a block of solid layers on isolated columns and a plurality of isolated columns on the block of solid layers formed by the system of FIG. 1.
Figure 2H:
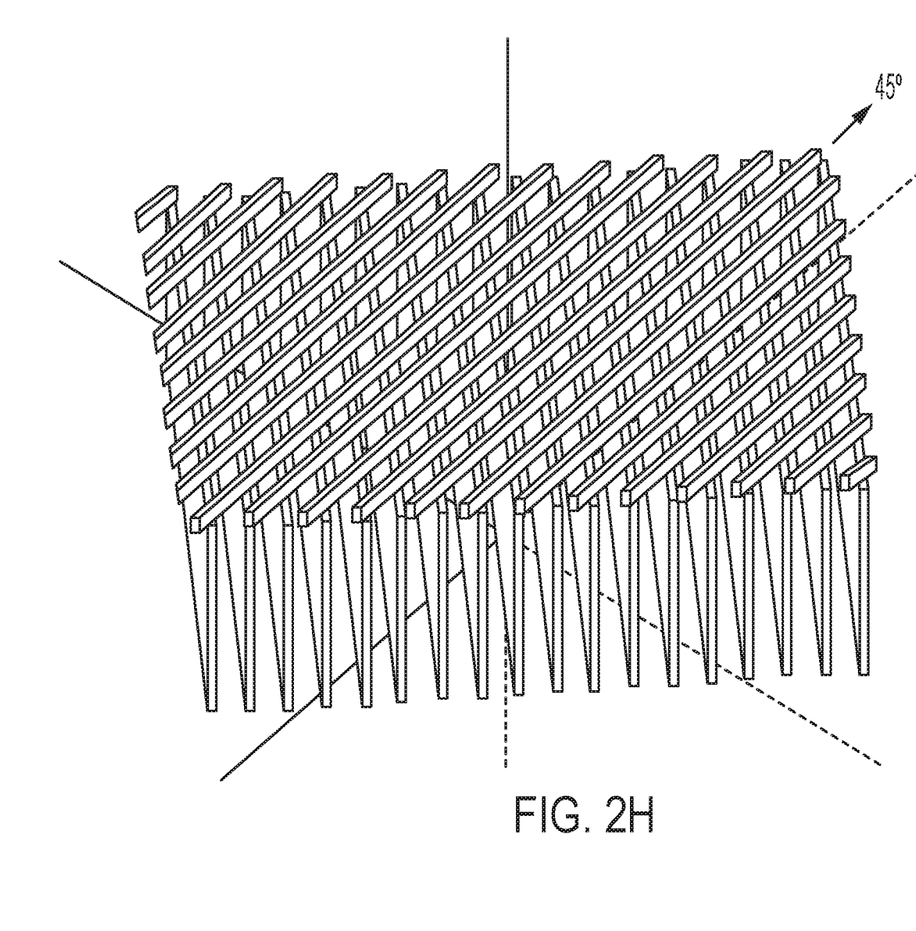
FIG. 2H depicts a layer of swaths formed at a 45° angle on a plurality of isolated columns as formed by the system of FIG. 1 to support overhanging features of an object.

In cases where the height of the support structure may be difficult to achieve with isolated columns of support only because the height of the column makes it structurally unstable, additional structural strength can be added by forming solid layers in the support structure occasionally before resuming the building of the columns. One way of using solid layers is to form most of the support structure 340 as shown in FIG. 2F with solid layers to form a solid support block 344 and then produce individual columns 308 on regions of the topmost support layer of support block 344. Another way of using solid layers is to insert them occasionally either individually or as a small grouping of solid layers 348 as shown in FIG. 2G between larger distances of layers with individual columns.

When printing support structures with individual columns that either alternate with swaths at −45° and 45° or alternate with swaths at −135° and 135°, the multi-nozzle extruder can be advanced in a cross-process direction between swaths. The individual columns thus formed are more strongly supported and more likely to start well if the nozzles are left open and allowed to extrude during the advance between swaths.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An additive manufacturing system comprising:
a multi-nozzle extruder having a faceplate with a plurality of nozzles;
a plurality of valves, each valve in the plurality of valves being configured to open and close one of the nozzles in a one-to-one correspondence;
an actuator operatively connected to the multi-nozzle extruder, the actuator being configured to move the multi-nozzle extruder in a plane parallel to the faceplate that has a pair of orthogonal axes that define a 0°, 180°, 90°, or 270° path of movement for the multi-nozzle extruder in the plane and to move the multi-nozzle extruder toward and away from a surface on which the multi-nozzle extruder emits extrusion material; and
a controller operatively connected to the plurality of valves and the actuator, the controller being configured to:
operate more than one valve in the plurality of valves to open more than one nozzle in the multi-nozzle extruder; and
operate the actuator to move the multi-nozzle extruder along a path in the plane parallel to the faceplate at one of a 45°, −45°, 135°, or −135° direction with reference to the orthogonal axes to form with material extruded simultaneously from the more than one open nozzle a first group of multiple parallel ribbons of support structure outside a perimeter of a layer of an object being formed on the surface.

2. The system of claim 1, the controller being further configured to:
operate the actuator to move the multi-nozzle extruder at a first angle to infill a portion of the object within the perimeter of the object, the first angle being different than the direction of movement of the multi-nozzle extruder to form the first group of multiple parallel ribbons outside the perimeter of the layer.

3. The system of clam 2 wherein the first angle is either at 0°, 180°, 90°, or 270°.

4. The system of claim 3, the controller being further configured to:
operate the actuator to move the multi-nozzle extruder so the opened nozzles form the first group of multiple parallel ribbons of the support structure with equal space between adjacent ribbons.

5. The system of claim 4, the controller being further configured to:
operate the actuator to advance the multi-nozzle extruder a distance that is greater than a distance that the multi-nozzle extruder is advanced to infill the portion of the object within the perimeter of the object; and
operate valves in the plurality of valves to open nozzles in the multi-nozzle extruder that are outside the perimeter of the object being formed to form a second group of multiple parallel ribbons on the first group of multiple parallel ribbons to form another layer of the support structure that is oriented at an angle that is different than the direction of movement used to form the first group of multiple parallel ribbons.

6. The system of claim 5, the controller being further configured to:
operate the valves in the plurality of valves to form the second group of multiple parallel ribbons with adjacent ribbons that are equally spaced.

7. The system of claim 6, the controller being further configured to:
operate the actuator to move the multi-nozzle extruder so the second group of multiple parallel ribbons extends along a direction that is perpendicular to a direction along which the first group of multiple parallel ribbons extends before operating the nozzles in the multi-nozzle extruder to form at least a portion of a layer of the object on the layer of the support structure formed by the second group of multiple parallel ribbons.

8. The system of claim 1, the controller being further configured to:
operate the actuator to move the multi-nozzle extruder to form a second group of multiple parallel ribbons on top of the first group of multiple parallel ribbons, the second group of multiple parallel ribbons extending in a same direction as the first group of multiple parallel ribbons extends.

9. The system of claim 1, the controller being further configured to:
operate the actuator to move the multi-nozzle extruder to form a second group of multiple parallel ribbons on top of the first group of multiple parallel ribbons, the second group of multiple parallel ribbons extending in a direction that is perpendicular to a direction in which the first group of multiple parallel ribbons extend.

10. The system of claim 1, the controller being further configured to:
operate the actuator to move the multi-nozzle extruder bidirectionally along a 45° and −135° path of movement with reference to the orthogonal axes and move the multi-nozzle extruder bidirectionally along a −45° and 135° path of movement with reference to the orthogonal axes.

* * * * *